(12) United States Patent
Wormsbaecher et al.

(10) Patent No.: US 7,553,238 B2
(45) Date of Patent: Jun. 30, 2009

(54) CONNECTING ASSEMBLY BETWEEN A SHAFT JOURNAL AND A CONSTANT VELOCITY UNIVERSAL JOINT

(75) Inventors: Hans Wormsbaecher, Lake Orion, MI (US); Eric LaMothe, Goodrich, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 0 days.

(21) Appl. No.: 11/765,710

(22) Filed: Jun. 20, 2007

(65) Prior Publication Data
US 2007/0249423 A1  Oct. 25, 2007

Related U.S. Application Data

(63) Continuation of application No. 11/258,563, filed on Oct. 25, 2005, now abandoned.

(51) Int. Cl.
F16D 3/84 (2006.01)
(52) U.S. Cl. ........................................ 464/172; 464/906
(58) Field of Classification Search ................ 464/140, 464/145, 171, 906, 170, 176, 177, 904, 905, 464/178
See application file for complete search history.

(56) References Cited

U.S. PATENT DOCUMENTS

| | | | | |
|---|---|---|---|---|
| 1,286,267 A | * | 12/1918 | Fetcher | 464/171 X |
| 1,436,785 A | * | 11/1922 | Thiemer | 464/171 X |
| 1,503,571 A | * | 8/1924 | McCall | 464/171 |
| 1,797,215 A | * | 3/1931 | Williams | 464/171 X |
| 2,008,830 A | * | 7/1935 | Johnson | 464/171 |
| 4,094,376 A | * | 6/1978 | Welschof | 464/906 |
| 4,178,778 A | * | 12/1979 | Orain | 464/905 |
| 4,240,680 A | | 12/1980 | Krude et al. | |
| 4,869,556 A | * | 9/1989 | Gees | |
| 5,501,639 A | | 3/1996 | Krude | |
| 5,586,939 A | | 12/1996 | Swinney | |
| 6,152,825 A | * | 11/2000 | Doell | 464/140 |
| 6,220,969 B1 | | 4/2001 | Lilley | |

* cited by examiner

*Primary Examiner*—Greg Binda
(74) *Attorney, Agent, or Firm*—Jennifer M. Brumbaugh; Mick A. Nylander

(57) ABSTRACT

A connecting assembly between a shaft journal and a constant velocity universal joint having an outer joint part and an inner joint part engaged by the shaft journal. The inner joint part includes an elongated neck portion with at least one insertion groove formed therein, and the shaft journal has at least one corresponding insertion groove. A securing clip engages the corresponding insertion grooves to axially secure the inner joint part and shaft journal with respect to each other. A boot is axially secured to the inner joint part neck portion, substantially enveloping the inner joint part, and sealingly engaging an outer surface of the outer joint part to seal at least one side of a joint chamber of the constant velocity universal joint.

9 Claims, 3 Drawing Sheets

CONNECTING ASSEMBLY BETWEEN A SHAFT JOURNAL AND A CONSTANT VELOCITY UNIVERSAL JOINT

CROSS-REFERENCE TO RELATED APPLICATION

This application is a Continuation of U.S. patent application Ser. No. 11/258,563 entitled "Rigid Joint Sealing System" filed on Oct. 25, 2005, now abandoned.

TECHNICAL FIELD

The present invention relates generally to motor vehicle shaft joints, and more particularly concerns a joint system for rigid sealing.

BACKGROUND OF THE INVENTION

Constant velocity joints connecting shafts to drive units are common components in automotive vehicles. The drive unit typically has an output shaft or an input shaft for receiving the joint. Typically, the drive unit is an axle, transfer case, transmission, power take-off unit or other torque device, all of which are common components in automotive vehicles. Typically, one or more joints are assembled to the shaft to form a propeller or drive shaft assembly. It is the propeller shaft assembly which is connected, for instance, at one end to the output shaft of a transmission and, at the other end, to the input shaft of a differential. The shaft is solid or tubular with ends adapted to attach the shaft to an inner race of the joint thereby allowing an outer race connection to a drive unit. The inner race of the joint is typically press fit, splined, or pinned to the shaft making the outer race of the joint available to be bolted or press fit to a hub connector, flange or stubshaft of the particular drive unit. At the other end of the propeller shaft, the same typical connection is made to a second drive unit when connecting the shaft between the two drive units. Optionally, the joint may be coupled to a shaft for torque transfer utilizing a direct torque flow connection. Regardless of the connection type, constant velocity joints require, for improved joint life, a sealed environment.

Elastomer boots of the flexible or soft type improve the life of a constant velocity joint by sealing out contaminates and retaining joint lubrication. Elastomer boots are primarily used for sealing two parts that can be articulated relative to one another and which, more particularly, rotate at the same time. These parts constitute a joint. A typical application refers to sealing joints of the constant velocity and universal types. For this purpose, a boot with a cylindrical portion, typically having a smaller diameter is slipped on to a shaft connected to a first joint component, and an annular portion with a greater diameter is connected either directly or via an intermediate element to a second joint component. Between the cylindrical portion mentioned first and the annular portion with the greater diameter, there extends a wall. The wall has the shape of half a torus for a roll boot and has a bellows shape for a convoluted boot. When the two joint components articulate relative to one another, the radius of curvature of the wall decreases on the inside of the angle and increases on the outside of the angle. When the joint rotates in the articulated condition, the change in curvature in the roll boot wall moves across the circumference, so that during a complete 360 degree rotation, each point of the boot wall passes through a curvature maximum and a curvature minimum causing flexing of the boot wall. Flexing also occurs for each rotation of the boot due to gravitational and centripetal forces. However, the soft boot may be subject to material decay caused by mechanical, chemical and thermal attack caused by the environment in which it is used.

Moreover, a soft boot may be prone to puncture or tearing. Additionally, the soft boot may blow out or rupture when subjected to increase pressure, has shorter boot life when used in high-speed high angle joint seal applications, and typically requires multiple crimped connections to seal the soft boot to the joint parts.

It would be advantageous to have a boot and sealing system that overcomes some of the attributes indicated above.

SUMMARY OF THE INVENTION

Accordingly, the present invention provides a rigid joint sealing system. The rigid joint sealing system provides the benefit of having a hard boot for sealing a constant velocity joint (CVJ) that is less prone to puncture or tearing. The inventive rigid joint sealing system may be used with CVJ assemblies having shaft to drive torque transfer utilizing direct torque flow connectors or traditional shaft connectors. Additional benefits with the rigid joint sealing system may include improved boot blow out protection, higher allowable internal joint pressure, improved environmental resistance, use in high speed high angle joint seal applications, improved seal life due to internal sealing structure and may eliminate crimped connections.

In one embodiment, the rigid joint sealing system includes an inner joint part, a hard boot, an outer joint part and a seal. The hard boot includes an internal surface and is axially secured to the inner joint part. The outer joint part includes an external surface and is rotationally secured to the inner joint part. Wherein the seal is connected to one of the surfaces while having sealing engagement with the other surface.

In another embodiment of the present invention, a hard boot for use with a rigid joint sealing system is provided. The hard boot includes a first end adapted for axial retention on an inner joint part, where the inner joint part is rotationally coupled to an outer joint part. The hard boot also includes a boot housing extending from the first end having an inner semi-spherical surface, the boot housing being adapted for partially surrounding the outer joint part while engaging a membrane seal there between.

A further embodiment of the present invention provides a rigid joint sealing system having a hard boot optimisation ratio. In particular, the hard boot optimisation ratio is adapted to one of the embodiments of the inventive rigid joint sealing system. The rigid joint sealing system includes: an inner joint part comprising inner ball tracks; a hard boot axially secured to the inner joint part, and comprising an inner surface defining an internal radius (R1); an outer joint part comprising outer ball tracks and an outer surface defining an external radius (R2); a membrane seal having a designed compression thickness (CT) coupled to one of the surfaces having sealing engagement with the other of said surfaces; a cage between the inner joint part and the outer joint part; and a plurality of balls held by the cage and engaging pairs of the inner and outer ball tracks, wherein the hard boot optimisation ratio (HB) is satisfied such that:

$0.7 \leq HB \leq 1.3$ wherein, $HB = ((R2 + CT)/R1)$.

The present invention has advantages by providing a rigid joint sealing system. The present invention itself, together with further intended advantages, will be best understood by reference to the following detailed description and taken in conjunction with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION OF THE INVENTION

In the following description, various operating parameters and components are described for one or more constructed embodiments. These specific parameters and components are included as examples and are not meant to be limiting.

While the invention is described with respect to a rigid joint sealing system of a constant velocity universal joint for use in a vehicle, the following apparatus is capable of being adapted for various purposes including automotive vehicles drive axles, motor systems that use a propeller shaft, or other vehicles and non-vehicle applications which require propeller shaft assemblies for torque transmission.

Figure 1:
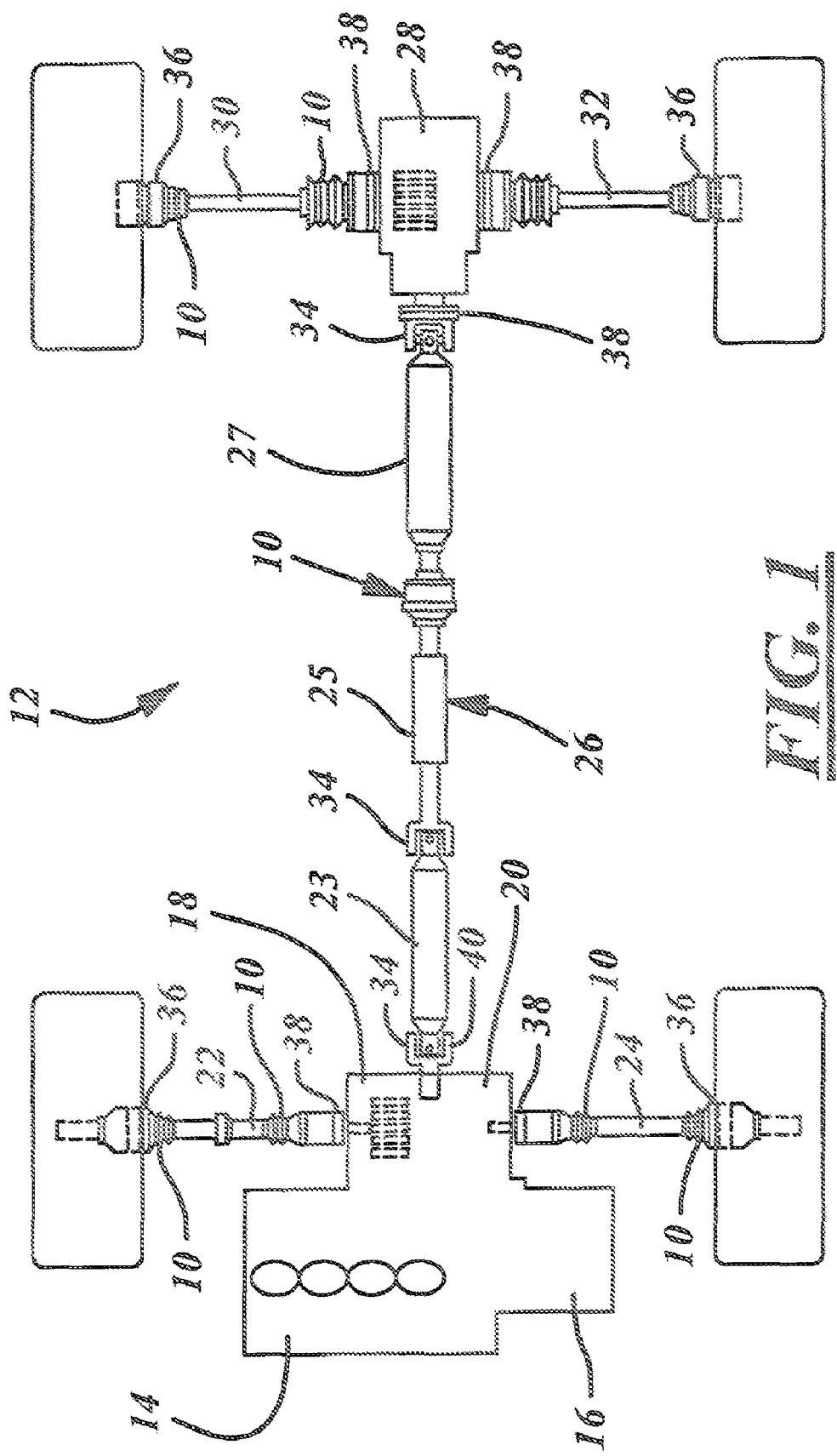
FIG. 1 shows a plan view of an exemplary drive system for a typical 4-wheel drive automobile wherein the present invention may be used to advantage.

An exemplary drive system 12 for a typical 4-wheel drive automobile is shown in FIG. 1. While a 4-wheel drive system is shown and described the concepts here presented could apply to a single drive unit system or multiple drive unit system, including rear wheel drive only vehicles, front wheel drive only vehicles, all wheel drive vehicles, and four wheel drive vehicles. In this example, the drive system 12 includes an engine 14 that is connected to a transmission 16 and a power take-off unit 18. A front differential 20 has a right hand side half shaft 22 and left hand side half shaft 24 each of which are connected to a wheel and deliver power to the wheels. On both ends of the right hand side half shaft 22 and left hand side half shaft 24 are constant velocity joints 10. A propeller shaft 26 connects the front differential 20 to a rear differential 28 wherein the rear differential 28 includes a rear right hand side shaft 30 and a rear left hand side shaft 32, each of which ends with a wheel on one end thereof. Constant velocity joints 10 are located on both ends of the half shafts 30, 32 that connect to the wheels and the rear differential 28. The propeller shaft 26, shown in FIG. 1, is a three-piece propeller shaft that includes a plurality of cardan joints 34 and one high-speed constant velocity joint 10. The propeller shaft 26 includes interconnecting shafts 23, 25, 27. The constant velocity joints 10 transmit power to the wheels through the propeller shaft 26 even if the wheels or the propeller shaft 26 have changed angles due to steering, raising or lowering of the suspension of the vehicle. The constant velocity joints 10 may be any of the standards types known, such as a plunging tripod, a cross groove joint, a fixed ball joint, a fixed tripod joint, or a double offset joint, all of which are commonly known terms in the art for different varieties of constant velocity joints 10. The constant velocity joints 10 allow for transmission of constant velocities at angles typically encountered in every day driving of automotive vehicles in both the half shafts, interconnecting shafts and propeller shafts of these vehicles. Optionally, each cardan joint 34 may be replaced with any other suitable type of joint, including constant velocity joint types. The inventive rigid joint sealing system may be utilized to advantage for any of the above mentioned joint locations not requiring a plunging type of joint.

The shafts 22, 23, 24, 25, 27, 30, 32 may be solid or tubular with ends adapted to attach each shaft to an inner race or an outer race of a joint in accordance with a traditional connection, thereby allowing the outer race or inner race to be connected to a hub connector 36, a flange 38 or stubshaft 40 of each drive unit, as appropriate, for the particular application. Thus, any of the traditional connections identified in FIG. 1 at 10 or 34 may be direct torque flow connections in accordance with a first embodiment (FIG. 2) of the present invention or may be a typical joint connection in accordance with a second embodiment (FIG. 3) of the present invention.

Figures 2, 3:
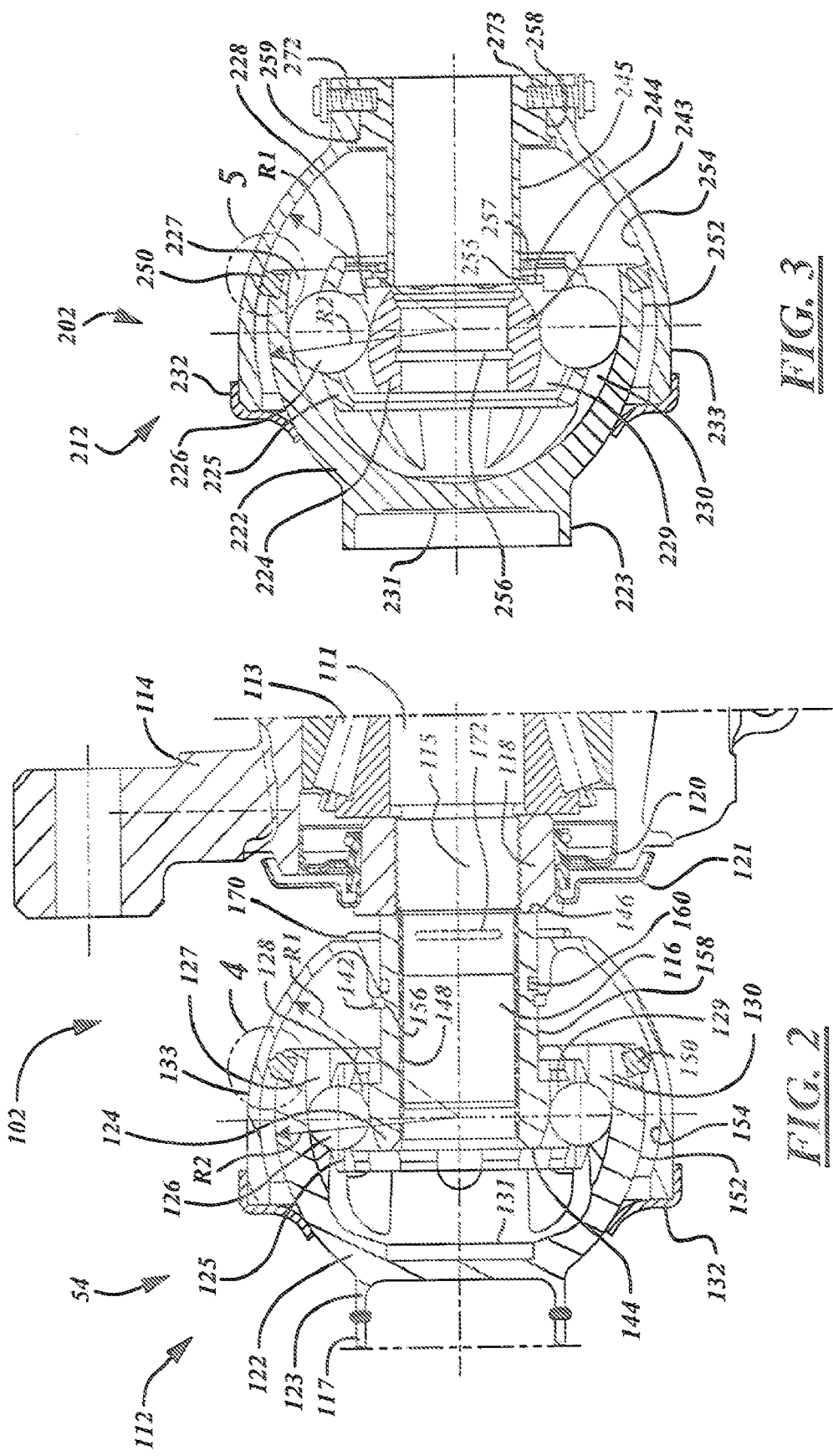
FIG. 2 shows a first embodiment of an inventive rigid joint sealing system of a constant velocity universal joint.
FIG. 3 shows a second embodiment of an inventive rigid joint sealing system of a constant velocity universal joint.

For completeness of the description of the first embodiment of the present invention as given in FIG. 2, the term direct torque flow (DTF) connection refers to a direct connection from the inner race of a CV joint to the shaft of a differential, transmission or transfer case, generally supplied by the customer. The direct connection typically is in the form of a spline because of its robust design features as understood by one skilled in the art. However, it is anticipated that other forms of direct connection are appropriate including fixed and releasable connections between the inner race and shaft. A mating key connection is just one example, without limitation, of a releasable connector between the inner race and the shaft. A welded connection would be a fixed direct connection example. Thus, a DTF connection refers to the inner race coupling to the shaft of a drive unit, such as a differential, transmission or transfer case without limitation, as opposed to the traditional connection mentioned above.

Also, as used herein, a DTF connector refers to a joint coupled to a shaft which forms a DTF propshaft assembly. Only together with the shaft of a differential, for example, does a DTF connector combine to make a DTF connection. It is recognized that the shaft of the drive unit may include the shaft of any input or output drive unit and is not necessarily limited to a shaft of a differential, transmission or transfer case.

Although the present invention as described in the first embodiment illustrated in FIG. 2 utilizes a DTF clip CVJ connector type, it is intended that the inventive rigid joint sealing system may be applied equally to constant velocity joints having other connection types.

FIG. 2 shows a first embodiment of an inventive rigid joint sealing system 102 of a constant velocity universal joint 54. The constant velocity universal joint in this embodiment is a DTF clip CVJ having a DTF connection assembly arranged between a shaft journal 111 and a DTF connector constant velocity universal joint 112. The shaft journal 111 is supported by a bearing 113 in a housing 114, which, in this case, is illustrated in the form of a housing in the driveline drive unit of a motor vehicle. The bearing 113 is axially tensioned by a tensioning nut 118 which has been threaded on to a threaded portion 115 of the shaft journal 111. A shaft seal 120 seals the tensioning nut 118 relative to the axle housing 114. By way of a cover 121 secured to the tensioning nut 118, the shaft seal is protected against damage.

The DTF connector constant velocity universal joint 112 of the rigid joint sealing system 102 is connected to a propeller shaft 117 of the motor vehicle driveline. The DTF connector constant velocity universal joint 112 comprises an outer joint part 122 welded to the propeller shaft 117 by a collar 123, an inner joint part 124, torque transmitting balls 126 as well as a ball cage 125. The inner joint part 124 having an internal spline 148 is axially secured on a toothed shaft portion 116 of the shaft journal 111 in a rotationally fast way. Between the collar 123 and the outer joint part 122 there is inserted a cover 131, which seals the joint towards the propeller shaft 117 and, more particularly, contains lubricants within the joint. Furthermore, a membrane seal 150 circumferentially connected to an outer circumference 152 of the outer joint part 122 is in sealing relationship with the inner circumference 154 of a hard boot 133 and which, in a way to be further described, seals the DTF connector constant velocity universal joint relative to the shaft journal 111. While the membrane seal 150 may be selectively positioned on the outer circumference of the outer joint part 122 in order to seal against the hard boot 133, the membrane seal may optionally be selectively connected to the inner circumference of the hard boot in sealing relationship with the outer circumference of the outer joint part. The seal, whether connected to the outer joint part or to the hard boot, provides an effective barrier during joint motion over the applicable semispherical sealing surface. Moreover, optionally, a wiper 132 encloses the outer end of the hard boot 133 and which environmentally seals the DTF connector constant velocity universal joint relative to the membrane seal 150. The wiper 132 is sealingly positioned on the outer joint part 122. The wiper 132 may be made from any pliable material and may be welded, glue, rolled and/or affixed in any other applicable way known to one of skill in the art onto the outer surface of the outer joint part 122. The DTF connector constant velocity universal joint 112 includes pairs of ball tracks 127, 128, 129, 130. The orientation of each ball track set is dependent upon the type of universal joint selected, which is well understood to a person having skill in the art. However, the ball tracks of the present invention are of the non-plunging type for CVJ applications requiring angular offset between the shafts that connect via the joint.

The inner joint part 124 further includes a front face 144, a back face 146, a clamping groove 156, a neck 158 and insertion grooves 172. The insertion grooves 172 are for receiving a clip 170 for axially securing the inner joint part 124 to the shaft journal 111 by way of a shaft reception groove (not shown). The hard boot 133 is axially form-fitting and positively secured to the neck 158 of the inner joint part 124 by way of a clamping strip 142 secured into the clamping groove 156 and further sandwiched between the clip 170 to prevent axial motion. A backup seal 160 between the inner joint part 124 and the hard boot 133 may optionally be provided.

FIG. 3 shows a second embodiment of an inventive rigid joint sealing system 202 of a constant velocity universal joint 212. The constant velocity universal joint in this embodiment is a fixed ball CVJ used to advantage in a typical shaft connection assembly. The constant velocity universal joint 212 comprises an outer joint part 222, a collar 223, an inner joint part 224, torque transmitting balls 226 as well as a ball cage 225. The inner joint part 224 includes a connection, such as an internal spline (not shown), for axially securing to a shaft journal, shaft, or stub flange for torque transmission in an rotationally fast way. The inner joint part may be coupled as is known by a person having skill in the art. Between the collar 223 and the outer joint part 222 there is inserted a vent cover 231 which may seal the joint when coupled to a propeller shaft or other connection and, more particularly, contains lubrication within the joint. Furthermore, a membrane seal 250 circumferentially connected to an outer circumference 252 of the outer joint part 222 is in sealing relationship with the inner circumference 254 of a hard boot 233 and which, in a way to be further described, seals the constant velocity universal joint relative to the inner joint part. While the membrane seal 250 may be selectively positioned on the outer circumference of the outer joint part 222 in order to seal against the hard boot 233, the membrane seal 250 may optionally be selectively connected to the inner circumference 254 of the hard boot 233 in sealing relationship with the outer circumference 252 of the outer joint part 222. The seal 250, whether connected to the outer joint part 222 or to the hard boot 233, provides an effective barrier during joint motion over the applicable semi-spherical sealing surface. Moreover, optionally, a wiper 232 encloses the outer end of the hard boot 233 and which environmentally seals the constant velocity universal joint relative to the membrane seal 250. The wiper 232 is positioned on the outer joint part 222 and functions as a backup barrier for sealing the joint. The wiper 232 may be made from any pliable material and may be welded, glue, rolled and/or affixed in any other applicable way know to one of skill in the art onto the outer surface of the outer joint part 222. The constant velocity universal joint 212 also includes pairs of ball tracks 227, 228, 229, 230.

The inner joint part 224 of the second embodiment includes an inner race part 243 connected to an extension part 245. The inner race part 243 includes a front face 244, and a circlip groove 256 for retentively engaging a connection shaft. The extension part includes a flange 255 coupled to the front face of the inner race part by bolts 257, a neck 258, a step 259 and retention bolts 272, 273. The hard boot 233 is axially form-fitting and positively secured to the neck 258 of the extension part 245 of the inner joint part 224 by way of retention bolts 272, 273 secured into the extension part 245 and further sandwiched between the step 259 to prevent axial motion between the parts.

Optionally, the inner race part 243 or the extension part 245 of the inner joint part 224 may be solid. Accordingly, a person of skill in the art would recognized the alternate connection types required in order to utilize a CVJ having a solid inner joint part 224.

The hard boot may be made from any material consistent with the intent and scope of the present invention. Specifically, the inventive rigid seal system provides a boot and a seal combination that enables the seal to have angular motion with respect to the outer joint part or the hard boot in such a way that the seal integrity and structural integrity is maintained between selected moving parts. In the present embodiment, the material of the hard boot is selected to have a substantially small amount of deflection or distortion during angular gyrations of the joint parts. Suitable materials would include wood, metal, or hard plastic, without limitation. The hard boot of the present embodiment is made from carbon steel. However, it is recognized that soft plastic, i.e., materials used for the traditional neoprene boots, may not have the requisite rigidity to properly maintain the sealing requirements as described herein. The word "hard" as used with the hard boot of the present invention is not meant to be limiting, but is provided to distinguish the boot of the present invention requiring only one fixed attachment from the prior art boots requiring at least two fixed attachment points in order to effectuate a sealed system.

While the material, coupling and treatment of the various other DTF parts have not been discussed; appropriate selection would be well understood by a person of skill in the art.

An additional aspect of the present invention, the Inventor has discovered certain relationship between the outer joint part and the hard boot that enable a robust rigid joint sealing system. The relationship is explained in detail below with reference to the first and second exemplary embodiments.

In order to obtain additional advantages, the outer joint part and the hard boot have a hard boot optimisation ratio (HB). The optimisation ratio represents one metric for providing geometric tolerance for further improvement to the rigid joint sealing system of the present invention. The parameters used to determine the hard boot optimisation ratio are: 1) an internal radius R1 defined by the axis origin of the inner joint part to the inner circumference of the hard boot; 2) an external radius R2 defined by the axis origin of the outer joint part to the outer circumference of the outer joint part; and 3) a membrane seal designed compression thickness CT. The seal designed compression thickness is a constant.

The hard boot optimisation ratio helps to minimize distortion of the inner circumference of the hard boot and or the outer circumference of the outer joint part. Furthermore, the hard boot optimisation ratio helps to maintain proper compression upon the membrane seal for proper sealing capability. The hard boot optimisation ratio is equal to the external radius plus the membrane seal designed compression thickness all divided by the internal radius. The hard boot optimisation ratio is calculated for optimised minimum distortion of the inner circumference of the hard boot and or the outer circumference of the outer joint part and is controlled substantially in the range defined by:

$$0.7 < ((R2+CT)/R1) < 1.3.$$

The hard boot optimisation ratio has improved range at approximately $0.9 \leq HB \leq 1.1$, with even better range at approximately $0.98 \leq HB \leq 1.02$.

Generally, FIGS. 4 through 9 illustrate partial cross sectional views of the first through sixth embodiments of the inventive rigid joint sealing systems 102, 202, 302, 402, 502, 602, respectively. Generally, Each of the rigid joint sealing systems 102, 202, 302, 402, 502, 602 include a membrane seal 150, 250, 350, 450, 550, 650 circumferentially connected to the outer circumference 152, 252, 352, 452, 552, 652 of the outer joint parts 122, 222, 322, 422, 522, 622, in sealing relationship with the inner circumference 154, 254, 354, 454, 554, 654 of the hard boot 133, 233, 333, 433, 533, 633, respectively. The membrane seals or seals in general are utilized to separate one environment from another environment. These environments may include the separation of gases, liquids, solids, heat regimes and pressure regimes, without limitation, in order to maintain the desired environmental relationship, such as retention of lubrication within the joint of the present invention. Seals, including material selection and design factors, used to accomplish environmental control are understood by persons of skill in the art and may be utilized to advantage in the various embodiment of the inventive rigid joint sealing system. Accordingly, any suitable material may be utilized to advantage, such as rubber, without limitation, for the seal. Moreover, composite seal designs may also be used to advantage. The membrane seals for the first through sixth embodiments will now discussed.

Figure 4:
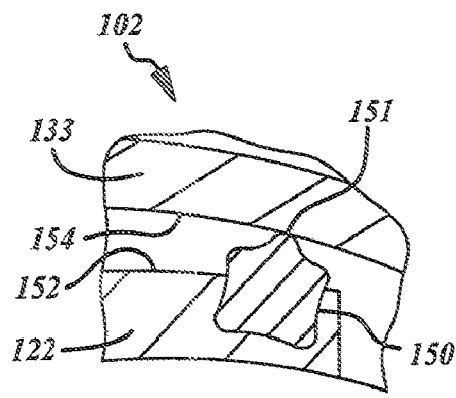
FIG. 4 shows a partial cross sectional view of the embodiment shown in FIG. 2.
Figure 5:
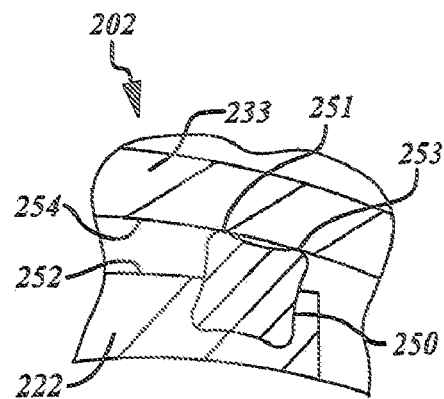
FIG. 5 shows a partial cross sectional view of the embodiment shown in FIG. 3.

FIG. 4 shows the membrane seal 150 having a single blade 151. In an optimal setting, the seal 150 may be compressed having focused sealing pressure or compression at the blade 151 and the hard boot 133 interface. FIG. 5 shows the membrane seal 250 having two single blades 251, 253 thereby providing better assurance of seal contact during angular motion of the CVJ.

Figure 6:
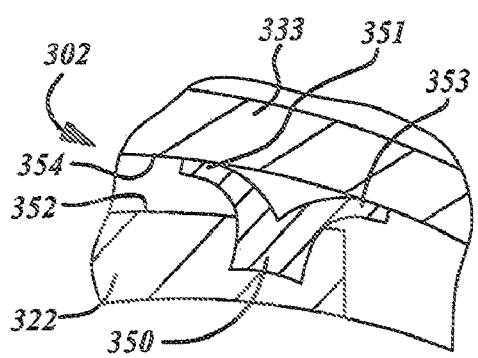
FIG. 6 shows a partial cross sectional view of a third embodiment of an inventive rigid joint sealing system.
Figure 7:
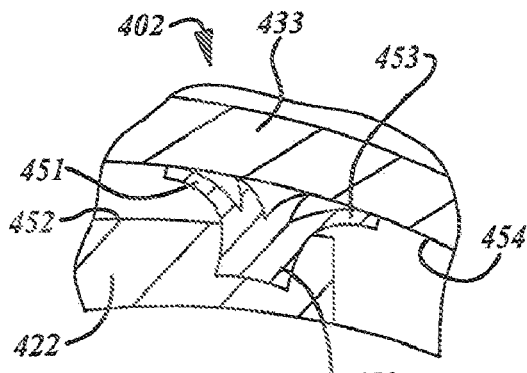
FIG. 7 shows a partial cross sectional view of a fourth embodiment of an inventive rigid joint sealing system.

FIG. 6 shows the membrane seal 350 having two wiper blades 351, 353. The two wiper blades 351, 353 may interface with the hard boot 333 by resilient loading of the material, compressive loading between the parts or by environmental pressure loaded in both seal directions. An advantage of the two wiper blade design, is that during angular joint motion, with or without an environmental pressure differential, one wiper blade is likely to maintain sealing contact with the hard boot. FIG. 7 shows the membrane seal 450 having two double wiper blades 451, 453.

Figure 8:
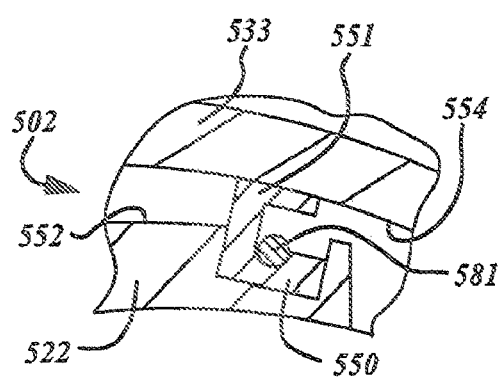
FIG. 8 shows a partial cross sectional view of a fifth embodiment of an inventive rigid joint sealing system.
Figure 9:
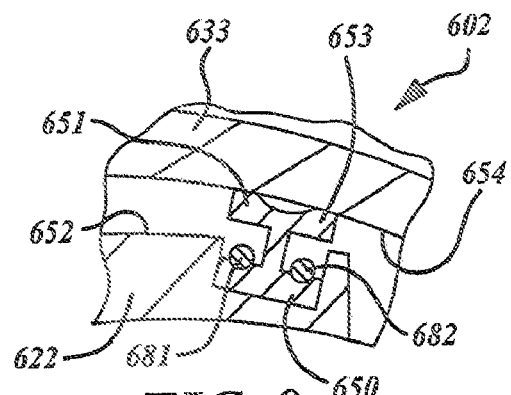
FIG. 9 shows a partial cross sectional view of a sixth embodiment of an inventive rigid joint sealing system.

FIG. 8 shows the membrane seal 550 having a blades 551 and retention spring 581. The retention spring 581 securely fastens the seal to the outer joint part 522 thereby allowing the seal to have higher compressive loading between the seal and the wiping or sealing surface of the hard boot. FIG. 9 shows the membrane seal 650 having two blades 651, 653 and two retention springs 681, 682 being used to advantage.

While the above embodiments of the membrane seals are provided as examples, it is recognized that various other types of membrane seal configurations may also be used with the inventive rigid joint sealing system.

From the foregoing, it can be seen that there has been brought to the art a new and improved rigid joint sealing system. While the invention has been described in connection with one or more embodiments, it should be understood that the invention is not limited to those embodiments. On the contrary, the invention covers all alternatives, modifications, and equivalents as may be included within the spirit and scope of the appended claims.

What is claimed is:

1. A connecting assembly between a shaft journal and a constant velocity universal joint comprising:
   an outer joint part having a substantially spherical outer surface;
   an inner joint part rotationally fixed with respect to the shaft journal, the inner joint part having an elongated neck portion with at least one insertion groove formed therein;
   a clip engaging said insertion groove to axially secure the inner joint part and shaft journal with respect to each other;
   a boot axially secured to said inner joint part neck portion, said boot having an inner semi-spherical surface partially surrounding the outer joint part outer surface; and
   a seal engaging said outer surface of the outer joint part and inner surface of said boot to seal the constant velocity joint.

2. An assembly according to claim 1 wherein the neck portion has a back face facing the shaft journal, and the clip is proximate the back face.

3. An assembly according to claim 2 wherein the clip is between the boot and the back face.

4. An assembly according to claim 3 wherein the boot is axially secured to the neck portion by a clamp and the clip.

5. An assembly according to claim 1 wherein the inner joint part and shaft journal are rotationally fixed by a splined connection.

6. An assembly according to claim 1 further comprising a wiper seal enclosing an outer end of said boot and said outer joint part outer surface to provide additional sealing of the constant velocity joint.

7. An assembly according to claim 1 wherein said seal is coupled to said outer surface of said outer joint part providing sealing between said seal and said inner surface of said boot, and wherein said boot is made from carbon steel and said seal is made from rubber.

8. In a direct torque flow connection whereby an inner joint part of a constant velocity joint is directly connected to a driven output shaft journal, a connecting assembly comprises:
- a shaft journal axially supported by a bearing within a housing, and including an exterior threaded portion;
- an outer joint part with an outer surface;
- an inner joint part rotationally fixed with respect to the shaft journal, the inner joint part having an elongated neck portion with at least one insertion groove formed therein;
- a nut threaded onto the threaded portion of the shaft journal and axially tensioning the bearing;
- a securing clip engaging said insertion grooves to axially secure the inner joint part and shaft journal with respect to each other beyond the threaded portion toward the constant velocity joint;
- a boot axially secured to said inner joint part neck portion, and having an inner semi-spherical surface partially surrounding the outer joint part outer surface;
- a seal engaging the outer surface of the outer joint part and inner surface of said boot to seal the constant velocity joint;
- wherein the neck portion has a back face facing the shaft journal and extending proximate the nut, and the clip is proximate the back face;
- wherein the boot is axially secured to the neck portion between a clamp and the clip.

9. An assembly according to claim 8 further comprising a wiper seal enclosing an outer end of said boot sealing and said outer joint part outer surface to provide additional sealing of the constant velocity joint.

* * * * *